March 23, 1943.                    J. D. MERRIFIELD                    2,314,654
                              AUTOMATIC WEIGHING MACHINE
                                 Filed Dec. 30, 1940

INVENTOR.
JOHN D. MERRIFIELD.
BY
ATTORNEY.

Patented Mar. 23, 1943

2,314,654

UNITED STATES PATENT OFFICE 2,314,654

AUTOMATIC WEIGHING MACHINE

John D. Merrifield, Rocky Ford, Colo.

Application December 30, 1940, Serial No. 372,245

4 Claims. (Cl. 249—44)

This invention relates to an automatic weighing machine and more particularly to the type of machine described and illustrated in detail in applicant's copending application Serial No. 267,599 filed April 13, 1939 now Patent No. 2,260,718.

The principal object of the invention is to provide an automatic machine for weighing and packaging dry, free flowing materials, such as suger, salt, etc.

Other objects of the invention are to provide a device of this character which will be entirely automatic in its operation; which will operate rapidly to give accurate and uniform weights; and which when started through a cycle of operations will automatically carry through that cycle without interruption.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front view of the improved machine;

Fig. 2 is a side view of the upper portion thereof;

Fig. 3 is a diagrammatic view illustrating the various electrical circuits and their relation to the various parts of the machine; and Fig. 4 is a diagrammatic view illustrating an alternate form of control clutch.

The improved automatic weighing machine is supported on any suitable frame 10 and consists principally of a feed receptacle 11, a weighing bucket 12, and a bag filling hopper 13 arranged in descending order.

The feed receptacle 11 is supplied with material, such as suger, through a suitable feed chute 23. The bottom of the feed receptacle 11 is closed by means of two gates, a main gate 14 and a dribble gate 15. The weighing bucket 12 is supported in a yoke on one extremity of a scale beam 16 through the medium of flexible links 17. The scale beam is flexibly suspended from a fixed cross bar 92 on similar flexible links 18.

The bottom of the weighing bucket is closed by a dump gate 19 suspended from a suitable hinge 20 at the side of the bucket and counterbalanced by means of a counter-balance weight 21 which is adjustably mounted on a weight arm 37 extending from the gate. The bag filling hopper 13 terminates in a neck 22 for insertion in a bag to be filled with the material from the machine.

The main gate 14 of the feed receptacle is operated by means of a solenoid 24 which is connected to the main gate through the medium of a suitable connecting link 25. The dribble gate 15 is similarly operated through the medium of a second solenoid 26 which is connected to the gate 15 by means of a link 27.

The dump gate 19 of the bucket 12 is held closed by means of a hooked latch 28, the upper extremity of which, engages in a notch 29 in a locking lever 30. The latch 28 is provided with a lifting arm 31 which is lifted by the locking lever 30 through the medium of a link 32 having an elongated opening 33 in which a pin 34 in the arm 31 is placed. The locking lever 30 is released at desired times by means of a lifting solenoid 35 which is connected to the lever 30 through the medium of a suitable link 36.

The weight of the gate 19 is substantially counter-balanced by the counter-balance weight 21. When the weight of the bucket contents is resting on the gate, however, the total weight on the gate exceeds that of the counter weight 21 so that, when the gate is released, the weight 21 and its weight arm 37 will swing upwardly alongside the bucket 12. At this time a stop member 38 will drop downwardly behind the weight arm 37, as shown in Fig. 2, to prevent the gate from swinging closed. The stop member is withdrawn at pre-determined times by means of a stop solenoid 39. The stop member passes through a suitable guide 40 on the side of the bucket.

The scale beam 16 is balanced by means of an adjustable main weight 41 and an adjustable dribble weight 42. The dribble weight is mounted on a hinged weight arm 43 which is supported at one extremity from a hinged link 44 having a pin 45 riding in a slotted opening 46 in the scale beam 16. The movable extremity of the weight arm 43 engages an adjustable stop member 47 when the bucket 12 is empty to relieve the scale beam of the weight of a portion of the dribble weight 42 to cushion the downward movement of the former.

Below the rearward extremity of the scale beam 16, a switch frame 48 is mounted. A first tilting plate 49 is mounted in suitable brackets 50 extending above the switch frame 48. The downward tilt of the plate 49 is limited by means of a stop screw 51. The plate carries a mercury switch, which will be herein designated as the main gate switch 52. A second tilting plate 53 is also mounted on suitable brackets 54 on the switch frame 48. One extremity of the second plate 53 contacts the adjacent extremity of the first plate 49 so that as the former extremity moves downwardly, it will force the latter extremity downwardly to close the main gate switch 52. A dribble gate switch 55 is mounted on the upper extremity of the tilting plate 53. The plate 53 is tilted by the movement of the rear extremity of the scale beam 16 through the medium of a connecting link 56.

The various circuits of the machine are controlled from a switch operating cam 57, which is diagrammatically illustrated in Fig. 3, mounted on a cam shaft 58 driven from a suitable motor 59 through the medium of a drive belt 60. The belt frictionally engages a driven pulley 61 on the shaft 58. The pulley and shaft are normally held stationary by a dog 62 which projects to engage a receiving notch in the extremity of a stop lever 63. The lever 63 is pivoted intermediate its extremities, as shown at 64, and is actuated from a clutch solenoid 65 to which it is connected through the medium of a link 66.

Thus, when the solenoid 65 is energized, it will lift one extremity of the lever 63 causing the other extremity to disengage the dog 62 to allow the pulley 61 to rotate under the impulse of the belt 60. The speed of movement is relatively slow being from four to ten revolutions per minute. The belt 60 is operated slightly loose and is held in frictional engagement with the pulleys by means of an idler pulley 67 actuated by a spring 68. When the stop member 62 is engaging the lever 63, the tension in the lower reach of the belt stretches the spring 68 so as to increase the relative length of the belt so as to loosen it sufficiently to allow it to freely slide around the pulley 61.

The cam 57 raises and lowers a cam follower arm 69 which is pivoted at one extremity on a suitable pivot pin 70. The arm carries three mercury switch tubes, there being a cam switch 71, a dump gate switch 72, and a latch switch 73. The latter switch is positioned on the downwardly turned extremity of the cam follower arm so that its operation will be retarded behind the operation of the switches 71 and 72.

The current to the clutch solenoid 65 is controlled by means of a clutch switch 74 preferably of the mercury type which can be operated from a hand push rod 75. Current is supplied to the various circuits of the device through main conductors 76 and 77 controlled by a supply switch 78. These conductors lead directly to the motor 59 so that the latter will rotate continuously during the operation of the machine.

*Operation*

Let us assume that the bucket 12 is filled with the pre-set amount, say 100 lbs., of material, such as sugar. The rear extremity of the scale beam 16 is, of course, elevated by the weight of the sugar and the switch plate 53 is inclined, to place the mercury in the outer end thereof so as to close a circuit between a conductor 80 and a conductor 81 leading both to the switches 52 and the main switch 71; a circuit is closed through the switch 71 between the conductor 81 and the main conductor 77; and a circuit is also closed through the switch 73, between the main conductor 77 and a conductor 82, through the solenoid 39 so that the latter is supporting the stop member 38. The switches 52 and 72 are open.

The operator now places a bag about the neck 22, as indicated in broken line at 79. In doing so he raises the rod 75 closing the switch 74. This causes current to flow from the main conductor 76 through a conductor 83 to the solenoid 65 thence through the conductor 80, the switch 55, the conductor 81, and the switch 71 to the main conductor 77, thus energizing the solenoid 65. This instantly releases the cam shaft 58 allowing it to rotate the cam 57.

As the high portion of the cam passes beneath the cam follower 69, the switch 71 is opened de-energizing the solenoid 65 to position the stop lever to stop the cam after it has completed one complete revolution. The switch 72 now closes a circuit through a conductor 84 to the solenoid 35 causing the latter to lift the locking lever 30 to release the swinging latch 28 allowing the dump gate 19 to swing open to discharge the contents of the bucket into the hopper 13. The switch 73 then opens to de-energize the solenoid 39 allowing the stop member 38 to drop to engage the weight arm 37 to hold the dump gate open.

The high portion of the cam now passes from beneath the follower arm 69. This first closes the circuit at the switch 73 causing the solenoids 39 to lift the stop member 38 so as to release the weight arm 37 to allow the dump gate 19 to swing closed. It then breaks the circuit of the switch 72 to de-energize the solenoid 35 to allow the latch 28 to engage and hold the gate 19 closed. A circuit is closed at the switch 71 supplying current through the conductor 81 to the switches 52 and 55.

As soon as the bucket is released of its load the rear extremity of the scale beam moves downwardly, first tilting the plate 53 downwardly to open the circuit to the solenoid 65 so that operation of the clutch switch 74 can not actuate the solenoid 65 to start the machine until the bucket is again filled with sugar. A circuit is also closed through the switch 55 between the conductor 81 and a conductor 85 leading to the solenoid 26 to open the dribble gate 15. The contact member in the switch 55 which is connected to the conductor 85 is electrically insulated except at its tip extremity so that it makes electrical contact with the mercury only when the latter is away from the contact for the conductor 80. The downward movement of the plate 53 causes it to tilt the plate 49 to close the switch 52 so as to close a circuit through a conductor 86 to the solenoid 24 to also open the main gate 14. This allows a full flow of sugar to enter the bucket 12.

As the bucket fills, the rear extremity of the scale beam slowly rises until the extremity of the slot 46 reaches the pin 45 this impresses the weight 42 on the beam and stops its upward movement. At this time, the various elements are in the positions illustrated in Fig. 3. The plate 53 has released the plate 49 sufficiently to break the circuit at the switch 52 to the solenoid 24 to allow the main gate 14 to close. A slow dribble stream is still entering the bucket 12. This stream continues until sufficient sugar has been added to lift the dribble weight 42, at which time, the plate 53 will be sufficiently tilted to break the circuit through the conductor 85 and close the dribble gate 15.

The machine now remains at rest until the operator again strikes the switch arm 75 to initiate a second cycle of operations.

In place of the sliding belt construction of Fig. 3, an automatic clutch could be employed, such as diagrammatically indicated in Fig. 4, employing a clutch arm 87 which is engaged by the lever 63. The arm 87 is connected to an inner clutch member 88 and is formed with an eccentric cam surface 89 which engages an outer clutch member 90, under the influence of a spring 91, when the arm 87 is released to cause the two members 88 and 90 to rotate in unison. Any other type of automatic clutch can be employed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An automatic weighing machine having a filling hopper, a main gate and a dribble gate controlling the discharge from said hopper, a weighing bucket, a dump gate controlling the discharge from said bucket, a scale beam pivotally supported intermediate its extremities and supporting said bucket from one of its extremities, and an automatic sequence device comprising: a rotary shaft; a cam secured on said shaft; driving means for said shaft; a cam follower positioned to be tilted by the contact of said cam thereagainst; a plurality of control mechanisms carried by said follower to operate said gates in predetermined sequence; an additional control mechanism operable from said cam to stop the rotation of said shaft after said sequence is completed; and means operable from said scale beam for preventing operation of said clutch device except when the weight of the contents of the weighing bucket is sufficient to tilt said beam.

2. An automatic weighing machine having a filling hopper, a main gate and a dribble gate controlling the discharge from said hopper, a weighing bucket, a dump gate controlling the discharge from said bucket, an individual solenoid for operating each of said gates; and an automatic sequence device comprising: a rotary cam; a continuously operating motor; an electrically operated clutch device for connecting said cam to said motor; a cam follower positioned to be tilted in consequence of the contour of said cam; a plurality of contact closing devices operable by said follower there being one of said devices in circuit with each of said solenoids to operate said gates in a predetermined sequence through each revolution of said cam; a circuit closing device operable by said follower for releasing said electrically operated clutch device at the completion of a revolution of said cam; and a manually operated switch for causing said clutch device to connect said cam to said motor.

3. An automatic weighing machine having a filling hopper, a main gate and a dribble gate controlling the discharge from said hopper, a weighing bucket, a dump gate controlling the discharge from said bucket, a scale beam pivotally supported intermediate its extremities and supporting said bucket from one of its extremities, an individual solenoid for operating each of said gates; and an automatic sequence device comprising: a rotary cam; a continuously operating motor; an electrically operated clutch device for connecting said cam to said motor; a cam follower positioned to be tilted in consequence of the contour of said cam; a plurality of contact closing devices operable by said follower there being one of said devices in circuit with each of said solenoids to operate said gates in a predetermined sequence through each revolution of said cam; a circuit closing device operable by said follower for releasing said electrically operated clutch device at the completion of a revolution of said cam; a manually operated switch for causing said clutch device to connect said cam to said motor; and an electric switch operable by said scale beam for rendering said manually operated switch inoperative until a predetermined amount of material has entered said bucket.

4. An automatic weighing machine having a filling hopper; a main gate and a dribble gate controlling the discharge from said hopper, a weighing bucket, a dump gate controlling the discharge from said bucket, a scale beam pivotally supporting said bucket, an individual solenoid for operating each of said gates; and an automatic sequence device comprising: a cam; a follower riding against said cam; a plurality of contact closing devices mounted on said follower, there being one of said devices in circuit with each of said solenoids; means for rotating said cam for operating said plurality of contact closing devices in a preset sequence; means for closing a circuit to place the rotating means in operation; and a circuit closing device in the latter circuit operable from said scale beam to prevent closing of the latter circuit until a predetermined weight is in said bucket.

JOHN D. MERRIFIELD.